(12) United States Patent
Kuiseko et al.

(10) Patent No.: US 8,345,515 B2
(45) Date of Patent: Jan. 1, 2013

(54) DEFLECTION OPTICAL ELEMENT, OPTICAL RECORDING HEAD AND OPTICAL RECORDING APPARATUS

(75) Inventors: Manami Kuiseko, Kyoto (JP); Koujirou Sekine, Ibaraki (JP)

(73) Assignee: Konica Minolta Opto, Inc., Tokyo (JP)

( * ) Notice: Subject to any disclaimer, the term of this patent is extended or adjusted under 35 U.S.C. 154(b) by 167 days.

(21) Appl. No.: 13/054,362

(22) PCT Filed: Jul. 2, 2009

(86) PCT No.: PCT/JP2009/062110
§ 371 (c)(1),
(2), (4) Date: Jan. 14, 2011

(87) PCT Pub. No.: WO2010/007897
PCT Pub. Date: Jan. 21, 2010

(65) Prior Publication Data
US 2011/0122754 A1    May 26, 2011

(30) Foreign Application Priority Data
Jul. 18, 2008  (JP) ................................. 2008-186842

(51) Int. Cl.
  *G11B 11/00*  (2006.01)

(52) U.S. Cl. .................... 369/13.13; 369/112.27; 385/37

(58) Field of Classification Search ............... 369/13.13, 369/112.27; 385/37
See application file for complete search history.

(56) References Cited

U.S. PATENT DOCUMENTS

| 6,944,112 | B2 | 9/2005 | Challener | |
|---|---|---|---|---|
| 2004/0001420 | A1 | 1/2004 | Challener | |
| 2009/0074358 | A1* | 3/2009 | Itagi et al. | 385/37 |
| 2010/0074063 | A1* | 3/2010 | Peng et al. | 369/13.32 |
| 2010/0123965 | A1* | 5/2010 | Lee et al. | 360/59 |
| 2010/0195238 | A1* | 8/2010 | Shimazawa et al. | 360/59 |
| 2010/0195239 | A1* | 8/2010 | Takayama et al. | 360/59 |

FOREIGN PATENT DOCUMENTS

| JP | 2-10527 | 1/1990 |
|---|---|---|
| JP | 2-162304 | 6/1990 |
| JP | 5-325244 | 12/1993 |
| JP | 2008-10027 | 1/2008 |
| JP | 2008-10094 | 1/2008 |

* cited by examiner

*Primary Examiner* — Wayne Young
*Assistant Examiner* — Brenda Bernardi
(74) *Attorney, Agent, or Firm* — Cozen O'Connor

(57) ABSTRACT

Disclosed is a deflection optical element, which makes it possible to deflect an incident light so as to couple the incident light to an optical element disposed in the later stage without deteriorating the optical efficiency. The deflection optical element, which deflects an incident light coming along a first optical axis at a deflection surface and emits an emission light propagating along a second optical axis so as to couple the emission light to either a diffraction grating or a refracting optical system, comprises at least one diffracting surface and at least one reflecting surface, wherein the angle θn, an angle θt derived as a total diffraction angle caused by the at least one diffracting surface, and an angle θa, which is formed at a second intersection of the first optical axis and the second optical axis, fulfill a conditional relationship of:

$0 \leq \theta n < \theta a < \theta t.$

11 Claims, 11 Drawing Sheets

DEFLECTION OPTICAL ELEMENT, OPTICAL RECORDING HEAD AND OPTICAL RECORDING APPARATUS

RELATED APPLICATIONS

This application is a U.S. National Phase Application under 35 USC 371 of International Application PCT/JP2009/062110 filed Jul. 2, 2009.

This application claims the priority of Japanese application 2008-186842 filed Jul. 18, 2008, the entire content of which is hereby incorporated by reference.

FIELD OF THE INVENTION

The present invention relates to a deflection optical element, an optical recording head and an optical recording apparatus.

This application is based on Japanese Patent Application NO. 2008-186842 filed on Jul. 18, 2008, with Japan Patent Office, the entire content of which is hereby incorporated by reference.

BACKGROUND OF THE INVENTION

The present invention relates to a deflection optical element, an optical recording head and an optical recording apparatus.

In recent years, it has been increasingly demanded that an information recording medium should have a high density recording capability, and according to the abovementioned trend, various kinds of recording methods for coping with such the demand have been proposed. The heat assistance magnetic recording method can be cited one of such the recording methods as abovementioned. In order to achieve the high density recording capability, it is necessary to make a dimension of an individual magnetic domain as smaller as possible, while a material having a strong magnetic coercive force is employed in order to store data in a stable manner. With respect to such the recording medium as abovementioned, it is necessary to generate a strong magnetic field at the time when the data is written into the recording medium. However, the strength of the magnetic field to be generated by a small-sized head, which is fabricated so as to correspond to the minimized magnetic domain, has been limited.

To overcome the abovementioned problem, there has been proposed such a method for recording a bit onto a recording spot in such a state that the magnetic coercive force is weakened by regionally heating the recording spot at the time of recording so as to generate a magnetic softening phenomenon at that spot, and then, stopping the heating operation to naturally cool the recording spot, in order to guarantee the stability of the magnetized bit recorded on the recording spot concerned. The abovementioned method is called the heat assistance magnetic recording method.

In the heat assistance magnetic recording method, it is preferable that the operation for heating the recording spot on the recording medium is completed instantaneously. Further, it is not allowed for the heating mechanism and the recording medium to physically contact each other. Owing to this restriction, the heating operation is generally achieved by using the light absorbing action, and the method in which the light is employed for the heating operation is called the light assistance method. In order to conduct the high density recording operation by employing the light assistance method, it is necessary to yield a microscopic light spot whose diameter is equal to or smaller than the wavelength of the light concerned.

To achieve the abovementioned goal, there has been employed such a optical head that utilizes the near field light (also referred to as the near visual field light), which is to be emitted from an optical aperture whose diameter is equal to or smaller than the wavelength of the incident light. Further, there has been proposed such the optical recording head, the light condensing efficiency of which is high, while having a capability of yielding a microscopic light spot as abovementioned. With respect to such the optical recording head as abovementioned, the U.S. Pat. No. 6,944,112 sets forth the following configuration.

The optical recording head is provided with a writing magnetic pole and a planar waveguide having a core layer and cladding layer located near the writing magnetic pole. The core layer is provided with at least an edge that is shaped in a parabolic line to reflect a magnetic wave within the core layer concerned, so as to guide the magnetic wave onto the focal point. Further, a leading edge portion, at which the focal point of the parabolic line is located, is formed in a flat surface shape as if the leading edge portion of the parabolic line were cut off. This leading edge portion is disposed near the air bearing surface (also referred to as an ABS: an Air Bearing Surface) at which the recording head and the recording medium oppose to each other.

Further, the core layer is provided with a diffraction grating to introduce light into the core layer concerned. For instance, when a collimated laser beam is irradiated onto the diffraction grating at a predetermined incident angle, the collimated laser beam is efficiently focused onto the core layer so as to converge onto the focal point located near the leading edge portion. The light emitted from the abovementioned leading edge portion is irradiated onto the recording medium so as to heat the recording medium.

On the other hand, with respect to the MO (Magnet-Optic) recording head, the principle of which is similar to that of the heat assistance magnetic recording head, in order to make the MO recording head formed in a thin shape, a certain type of MO recording head employs a reflection type diffraction grating that is provided with a converting function between convergence light or divergence light and parallel light, a function for bending the optical axis and a function for correcting an anisotropy of the light intensity distribution emitted by the laser diode, as an element that deflects the laser beam emitted by the laser diode. The reflection type diffraction grating abovementioned converts the diverging light, shaped in an ellipse, to the parallel light shaped in a circle, as set forth in Tokkaihei 5-325244 (Japanese Patent Application Laid-Open Publication).

With respect to the planar waveguide set forth in U.S. Pat. No. 6,944,112, when the parallel light, having a circler light-bundle cross sectional shape, being orthogonal to the optical axis thereof, enters into the diffraction grating that converges the parallel light emitted from the light source at the predetermined incident angle, the cross sectional shape of the incident light at the incident surface of the diffraction grating is the ellipse whose long axis is extended in a direction indicating the incident angle.

For instance, when the light bundle having the ellipse shape enters into the diffraction grating provided in the planar waveguide, as abovementioned, every kind of optical aberrations would be getting large. Specifically, since the spherical aberration and the field curvature become large in the deflecting direction in principal, the efficiency degradation becomes considerable level. Accordingly, owing to the influences of the abovementioned aberrations, when the light, focused onto the core layer by the diffraction grating, propagates within the core layer concerned so as to converge the light onto the focal point located near the leading edge portion, it becomes difficult to form such a light spot that is sufficiently small.

Further, according to the reflection type diffraction grating set forth in Tokkaihei 5-325244, by making the parallel light, shaped in a circular spot, enter onto the reflection type diffraction grating concerned, it becomes possible to make the reflected light to be formed in an ellipse shape having a short axis extended in a deflecting direction, due to the regression characteristic of the light. However, the deflecting direction is substantially the right angle, and the reflected light is the converged light. Therefore, even if the reflection type diffraction grating abovementioned is employed for the optical recording head set forth in U.S. Pat. No. 6,944,112, it is impossible to make the aberrations of the light, which is to be entered into the diffraction grating, small, so as to form a sufficiently small light spot by using the planar waveguide. Still further, although Patent Document 1 sets forth such a possibility that the thickness of the MO recording head is made to be thin by setting the inclination of the reflection type diffraction grating at an angle of 45° or smaller, since the deflection angle is substantially the right angle, optical elements, which are to be disposed on the optical path of the later stage after deflected in the optical system, would be factors for increasing the thickness of the MO recording head. As a result, one can hardly ask for making the thickness of the MO recording head thinner than ever.

SUMMARY OF THE INVENTION

To overcome the abovementioned drawbacks in conventional optical recording heads, it is one of objects of the present invention to provide a deflection optical element, which makes it possible to deflect the incident light so as to couple the incident light to an optical element disposed in the later stage without deteriorating the optical efficiency, and further, for instance, which makes it possible to thin and minimize the size of the optical recording head, and it is another one of objects of the present invention to provide an optical recording head and an optical recording apparatus, which are provided with the abovementioned deflection optical element.

Accordingly, at least one of the objects of the present invention can be attained by any one of the deflection optical elements, the optical recording head and the optical recording apparatus, described as follows.

(1) According to a deflection optical element reflecting an aspect of the present invention, the deflection optical element that deflects an incident light coming along a first optical axis at a deflection surface and emits an emission light propagating along a second optical axis, so as to couple the emission light to either a diffraction grating or a refracting optical system, wherein the first optical axis and the second optical axis are in unparallel with each other, and either a normal line of the diffraction grating or a third optical axis of the refracting optical system intersects the first optical axis at an angle θn, serving as an acute angle fainted at a first intersection thereof, the deflection optical element comprises: at least one diffracting surface; and at least one reflecting surface; wherein the angle θn, an angle θt derived as a total diffraction angle caused by the at least one diffracting surface, and an angle θa, which is formed at a second intersection of the first optical axis and the second optical axis, fulfill a conditional relationship of:

$$0 \leq \theta n \leq \theta a < \theta t.$$

(2) According to another aspect of the present invention, in the deflection optical element recited in item 1, the at least one diffracting surface is a single diffracting surface.

(3) According to still another aspect of the present invention, in the deflection optical element recited in item 2, the angle θa is set at a value in a range of 30°-60°.

(4) According to an optical recording head reflecting still another aspect of the present invention, the optical recording head, comprises: a deflection optical element that deflects an incident light coming along a first optical axis at a deflection surface and emits an emission light propagating along a second optical axis, so as to couple the emission light to either a diffraction grating or a refracting optical system, wherein the first optical axis and the second optical axis are in unparallel with each other, and either a normal line of the diffraction grating or a third optical axis of the refracting optical system intersects the first optical axis at an angle θn, serving as an acute angle formed at a first intersection thereof; and a slider that is provided with a diffraction grating into which the emission light emitted by the deflection optical element enters, and an optical element through which the emission light, entering from the diffraction grating, propagates so as to irradiate the emission light onto a recording medium; wherein the deflection optical element includes: at least one diffracting surface; and at least one reflecting surface; wherein the angle θn, an angle θt derived as a total diffraction angle caused by the at least one diffracting surface, and an angle θa, which is formed at a second intersection of the first optical axis and the second optical axis, fulfill a conditional relationship of:

$$0 \leq \theta n < \theta a < \theta t.$$

(5) According to an optical recording apparatus reflecting yet another aspect of the present invention, the optical recording apparatus, comprises: a light source; an optical recording head into which an incident light emitted by the light source enters; and a recording medium into which the optical recording head records information; wherein the optical recording head, comprises: a deflection optical element that deflects the incident light coming along a first optical axis at a deflection surface and emits an emission light propagating along a second optical axis, so as to couple the emission light to either a diffraction grating or a refracting optical system, wherein the first optical axis and the second optical axis are in unparallel with each other, and either a normal line of the diffraction grating or an third optical axis of the refracting optical system intersects the first optical axis at an angle θn, serving as an acute angle formed at a first intersection thereof; and a slider that is provided with a diffraction grating into which the emission light emitted by the deflection optical element enters, and an optical element through which the emission light, entering from the diffraction grating, propagates so as to irradiate the emission light onto the recording medium; wherein the deflection optical element includes: at least one diffracting surface; and at least one reflecting surface; wherein the angle θn, an angle θt derived as a total diffraction angle caused by the at least one diffracting surface, and an angle θa, which is formed at a second intersection of the first optical axis and the second optical axis, fulfill a conditional relationship of:

$$0 \leq \theta n \leq \theta a < \theta t.$$

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Initially, in order to clarify the subject of the present invention, referring to FIG. 20, a reference example will be detailed in the following.

Figure 20:
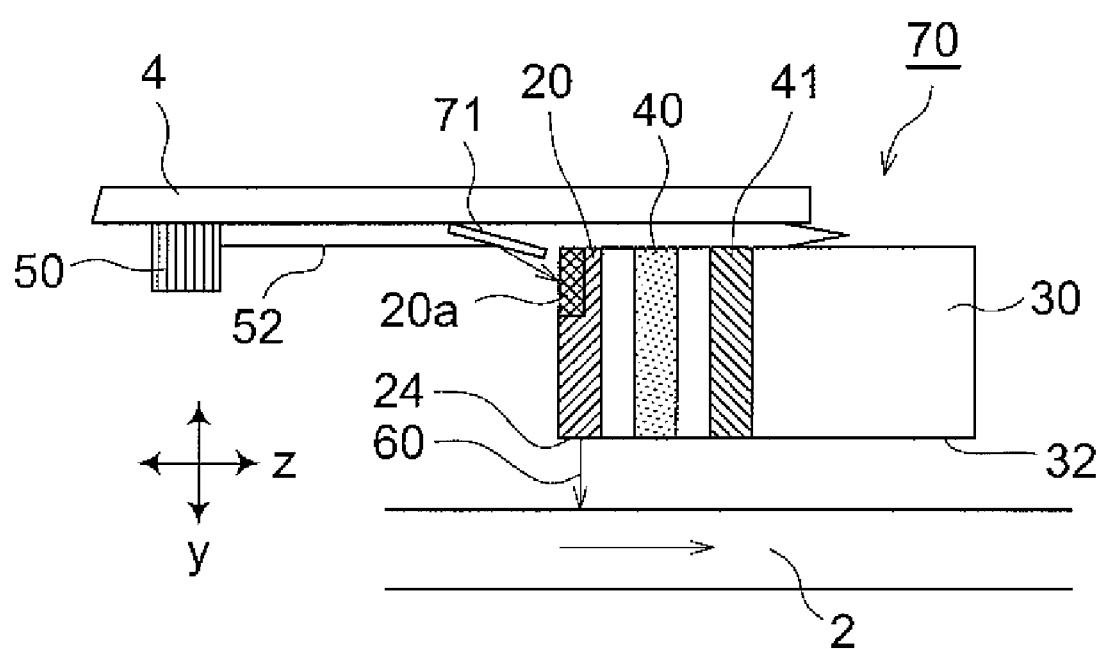
FIG. 20 shows a schematic diagram indicating a rough configuration of an optical recording head serving as a reference example.

FIG. 20 shows a schematic diagram indicating a configuration of an optical recording head 70 serving as the reference example. Light 52, emitted from a light source 50 as a parallel light, is deflected by a mirror 71 so as to enter into a diffraction grating 20a provided in a planar waveguide 20 at a predetermined incident angle. The light entering into the diffraction grating 20 propagates along the planar waveguide 20 and is irradiated towards a disk 2. The planar waveguide 20 is attached onto aside surface of a slider 30 supported by a suspension 4.

The light bundle cross sectional shape of the light 52 in a direction orthogonal to the optical path is a circle. This is because, when a laser source is employed as the light source 50, generally speaking, the laser source that emits a laser beam, the light bundle cross sectional shape of which in the direction orthogonal to the optical path is the circle, can be most easily obtained in the market concerned. When the light 52 is deflected by using a simple reflection surface of the mirror 71, the width of the light bundle in a surface perpendicular to the optical axis of the light 52. Accordingly, the light bundle that enters onto the diffraction grating 20, the incident surface of which is in parallel to the optical axis of the light 52, has such a width that is swollen in the deflecting direction, namely, the light bundle shaped in an ellipse, the long axis of which is extended in the "y" direction indicated by one of the coordinate arrows shown in FIG. 20, enters onto the diffraction grating 20a.

When the light bundle having such the ellipse shape enters into the diffraction grating 20a, every kind of optical aberrations would be getting large. Specifically, since the spherical aberration and the field curvature become large in the deflecting direction, the efficiency degradation becomes considerable level. Accordingly, owing to the influences of the above-mentioned aberrations, when the light, focused onto the planar waveguide 20 by the diffraction grating 20a, is converged onto the focal point located near the leading edge portion, it becomes difficult to form such a light spot that is sufficiently small.

Generally speaking, with respect to, so called, the outer axis light bundle having a relatively large amount of the spherical aberration and the field curvature as abovementioned, for instance, there has been considered such the method for making the width of the light bundle in the deflecting direction small by employing the light bundle regulation technique so as to suppress the aberrations concerned. However, there has arisen another problem that implementing the light bundle regulating operation also decreases the intensity of the light.

The present invention is achieved in view of the abovementioned subject of the reference example shown in FIG. 20, and relates to a deflection optical element that makes it possible to deflect the incident light so as to converge the deflected light onto the optical element of the later stage without deteriorating the optical efficiency. The deflection optical element, embodied in the present invention, can be employed for an optical recording head that performs an operation for recording data onto, for instance, a MO (Magnet-Optic) recording medium or a light recording medium.

Now, a magnetic recording head employing the light assistance method and a light assistance magnetic recording apparatus, both embodied in the present invention, will be detailed in the following. However, the scope of the present invention is not limited to the embodiments described in the following. In this connection, each of the structural elements and the parts, each of which is same as each other or equivalent to each other among the following embodiments, is attached with the same reference number, and the duplicated explanations for them will be omitted as needed.

Figure 1:
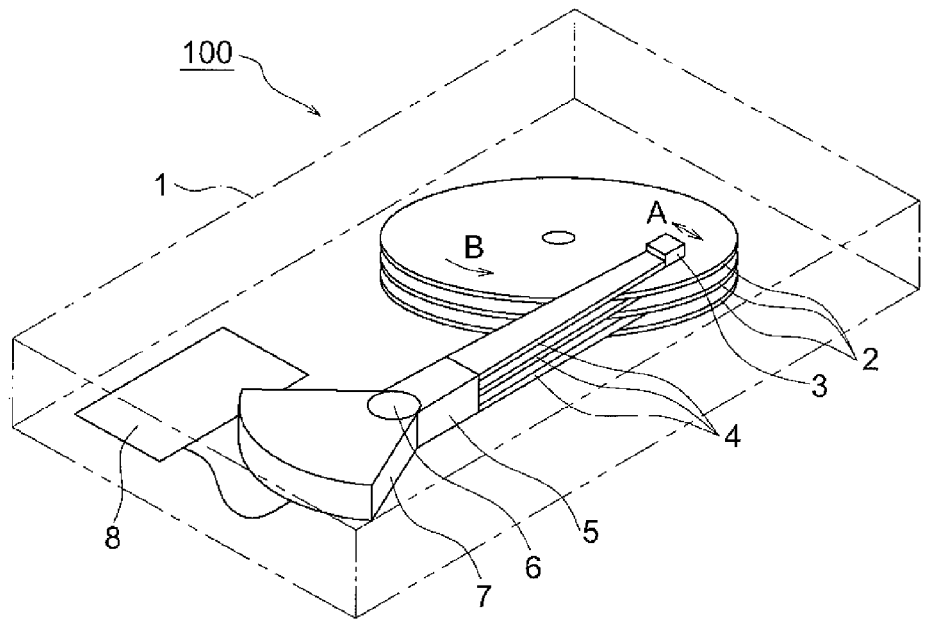
FIG. 1 shows a schematic diagram indicating a rough configuration of a light assistance magnetic recording apparatus incorporating a light assistance magnetic head, embodied in the present invention.

FIG. 1 shows a schematic diagram indicating a rough configuration of a light assistance magnetic recording apparatus 100 (for instance, an HDD (Hard Disc Drive)). The light assistance magnetic recording apparatus 100 is provided with the structural elements and sections of items (1) through (6) described as follows, which are assembled within a casing 1. Items (1) through (6) are:
(1) the disk (recording medium) 2 for recording use;
(2) the suspension 4 supported by an arm 5, which is disposed in such a manner that the arm 5 is rotatable in a direction of arrow A (a tracking direction) around a supporting axis 6 serving as a supporting point;
(3) a tracking actuator 7 attached to the arm 5;
(4) a light assistance magnetic recording head 3 (hereinafter, referred to as an optical recording head 3, for simplicity) attached onto the leading edge portion of the suspension 4 while placing a coupling member 4a between them;
(5) a motor (not shown in the drawings) to rotate the disk 2 in a direction indicated by arrow B; and
(6) a control section 8 that conducts operations for controlling various aspects of the optical recording head 3, such as moving actions of the tracking actuator 7, rotating actions of the motor, operations for irradiating the light modulated by the write information to be recorded onto the disk 2, operations for generating the magnetic field, etc.

Further, the light assistance magnetic recording apparatus 100 is so constituted that the optical recording head 3 moves relatively to the disk 2 while floating on the disk 2.

Figure 2:
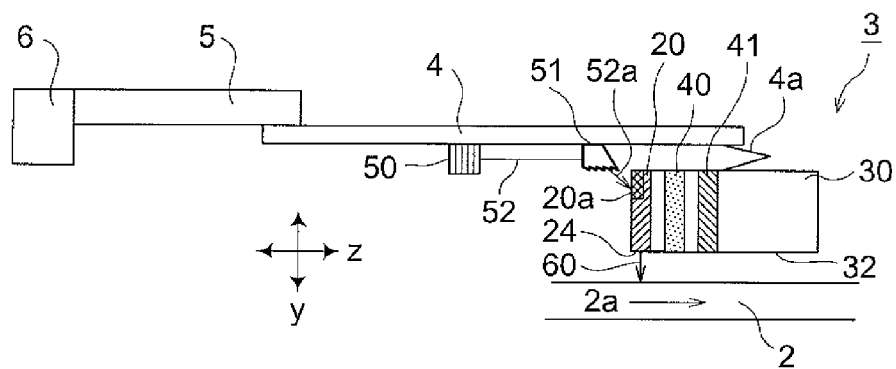
FIG. 2 shows a schematic diagram indicating a rough configuration of an optical recording head.

FIG. 2 shows a schematic diagram indicating a conceptual side view of the optical recording head 3. The optical recording head 3, which serves as such an optical recording head that utilizes light for the information recording operation, is provided with the slider 30, the planar waveguide 20, a magnetic recording section 40 and a magnetic reproducing section 41.

Although the slider 30 moves relatively to the disk 2 while floating on the disk 2, if a dust particle adhered onto the recording surface of the disk 2 or a kind of defect is accidentally formed on the disk 2, there arises such a possibility that the slider 30 would contact them. In order to reduce the wearing to be generated in that case, it is desirable that a hardened material having a high resistance to abrasion is employed for forming the slider 30. For instance, it is preferable that any one of a ceramic material including an $Al_2O_3$, an AlTiC or a Zirconia, a TiN, etc., is employed for this purpose. Further, it is also applicable that, as the wearing prevention processing, a surface treatment for increasing the resistance to abrasion is applied onto the surface of the slider 30, which opposes to the disk 2. For instance, by employing a DCL (Diamond Like Carbon) coating, it becomes possible to obtain not only a high transmission factor for the near infrared light, but also a high hardness being equal to or more than Hv=3000, which is ranked at a hardness level next to that of the diamond.

Further, the surface of the slider 30, which opposes to the disk 2, is provided with an air bearing surface (also referred to as an ABS (Air Bearing Surface)).

The light source 50 includes a laser element that emits a parallel light, which has a circler light-bundle cross sectional shape being orthogonal to the optical axis thereof. The light 52, emitted from the light source 50, is the parallel light that enters (couples) onto the diffraction grating 20a provided in the planar waveguide 20 (also called a grating copular). The scope of the configuration of the light source 50 is not limited to the above. As far as the light source 50 make it possible to enter the parallel light into the diffraction grating 20a, for instance, either a light source employing optical fibers that emit the parallel light for the edge portion thereof, or another light source combined with an optical system provided with a plurality of lenses can be applicable as the light source 50.

The light 52 emitted from the light source 50 is deflected by a deflection optical element 51, and a deflected light 52a enters into the diffraction grating 20a of the planar waveguide 20 at a predetermined incident angle. The deflection optical element 51 deflects the light 52 so that the light 52, emitted from the light source 50, can enter into the diffraction grating 20a at the predetermined incident angle, at which the light 52 is efficiently coupled to the diffraction grating 20a. In this connection, hereinafter, numeral 51 indicates the deflection optical element as a whole, while when indicating various kinds of concrete examples of the deflection optical element 51, each of the concrete examples is indicated by attaching another symbol to numeral 51, for instance, such as a deflection optical element 51A, a deflection optical element 518, etc.

The planar waveguide 20 is provided with the diffraction grating 20a into which the light enters and the waveguide having the core layer and the cladding layer to guide and emit the light inputted, so that the light deflected by the deflection optical element 51 is coupled to the waveguide, concretely speaking, the core layer, through the diffraction grating 20a. The light coupled to the waveguide propagates to a core-layer leading edge surface 24, and is emitted towards the disk 2 as an irradiation light 60 for heating a recording point.

Although the light source 50 is fixed onto the suspension 4 in the configuration shown in FIG. 2, it is also applicable that the light source 50 is fixed onto the arm 5. It is preferable that the light source 50 is disposed at such a position that is apart from the optical recording head 3 as far as possible, not only from a view point that the optical recording head 3 hardly accepts the influence of the heat generated by the light source 50, but also from another view point that the weight of the light source 50 and various kinds of additional stresses generated by the light source concerned hardly impede the floating action of the slider 30.

When the irradiation light 60 shaped in a microscopic light spot is irradiated onto the disk 2, the temperature of the recording spot of the disk 2, at which the irradiation light 60 is irradiated, is made to temporarily rise so as to decrease the magnetic coercive force of that point. Then, the magnetic information is written into the concerned recording spot, the magnetic coercive force of which is currently decreased, by the magnetic recording section 40.

In the configuration shown in FIG. 2, the planar waveguide 20, the magnetic recording section 40 and the magnetic reproducing section 41 are arranged from the ingressive side towards the recording area of the disk 2 to the egressive side from the concerned recording area (in a direction indicated by arrow 2a shown in FIG. 2) in order of the above. Since, by disposing the magnetic recording section 40 at a position immediately after the planar waveguide 20 as abovementioned, the writing operation can be completed before the recording spot is excessively cooled, the abovementioned arrangement is preferable. Further, although the magnetic reproducing section 41, for reading out the magnetic recording information written into the disk 2, is disposed at the position immediately after the magnetic recording section 40 in the above-exemplified configuration, it is also applicable that the magnetic reproducing section 41 is disposed at a position immediately before the planar waveguide 20.

Figure 3:
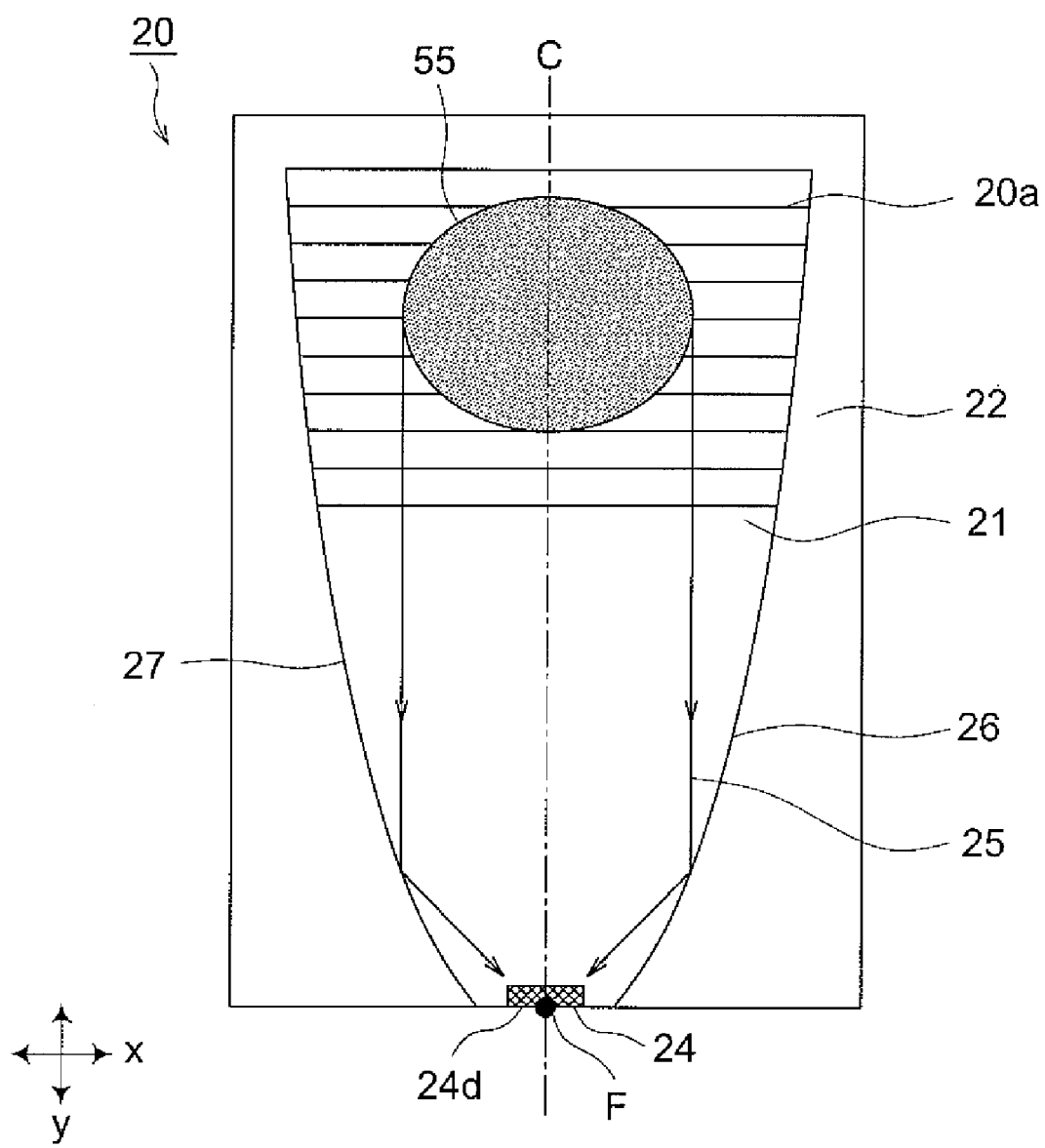
FIG. 3 shows a schematic diagram indicating a front view of a planar waveguide.
Figure 4:
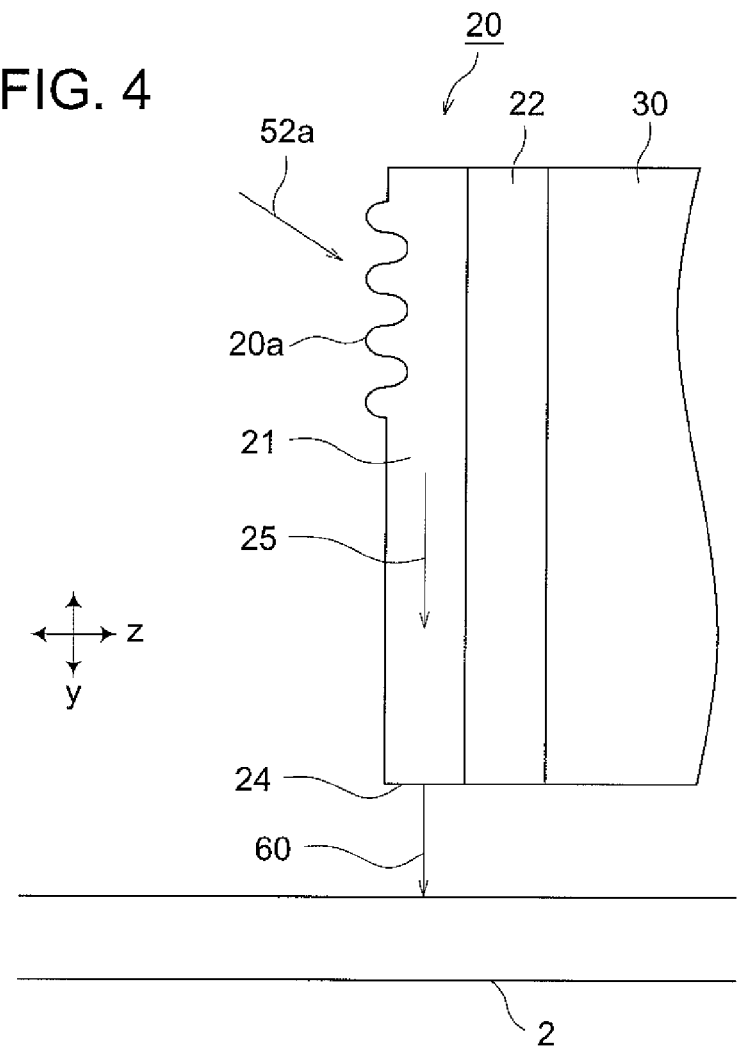
FIG. 4 shows a schematic diagram indicating a side view of a planar waveguide.

FIG. 3 shows a schematic diagram indicating a front view of the planar waveguide 20, and FIG. 4 shows a schematic diagram indicating a side view of the same. The planar waveguide 20 has a core layer 21 and a cladding layer 22, and the diffraction grating 20a, serving as a light inputting section, is formed therein. The waveguide can be formed by a plurality of layers, the refraction indexes of which are different from each other, and the refraction index of the core layer 21 is greater than that of the cladding layer 22. The abovementioned difference between the refraction indexes forms the waveguide to keep the light, currently propagating in the core layer 21, within the core layer 21, so that the light, kept therein, efficiently propagates in a direction indicated by arrows 25 and arrives at the core-layer leading edge surface 24.

The core layer 21 is made of any one of $Ta_2O_5$, $TiO_2$, ZnSe, etc., and its thickness is preferably set at a value in a range of 20-500 nm. On the other hand, the cladding layer 22 is made of any one of $SiO_2$, Air, $Al_2O_3$, etc., and its thickness is preferably set at a value in a range of 200-2000 nm.

The core layer 21 is provided with side surfaces 26 and 27, outer surface contours of which are shaped in parabolic lines so as to reflect the coupled light towards a focal point F of the core layer 21. In the front view shown in FIG. 3, the center axis of the bilaterally symmetrical parabolic lines is indicated by an axis C, which is perpendicular to a directrix (not shown in the drawings) and running through the focal point F, and the focal point of the parabolic lines is denoted by the focal point F. It is also applicable that a reflection material, for instance, a gold, a silver, an aluminum, etc., is coated onto the side surfaces 26 and 27, so as to employ it as an assistance material for reducing the light reflection loss to a level smaller than ever.

Further, the core layer 21 of the waveguide is provided with the core-layer leading edge surface 24, which is shaped in a flat surface as if it were formed by cutting off the leading edge portion of the parabolic lines, which is located near the disk 2.

Since the light, irradiated from the focal point F, abruptly diverges, by making the shape of the core-layer leading edge surface 24 flat, it preferably becomes possible to dispose the focal point F at such a point that is nearer to the disk 2 than ever. In this connection, it is also applicable that the focal point F is formed on the core-layer leading edge surface 24.

Figure 5A:
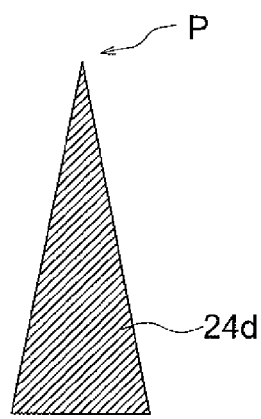
FIGS. 5a through 5c show schematic diagrams indicating concrete examples of shapes of various kinds of plasmon probes.
Figure 5B:
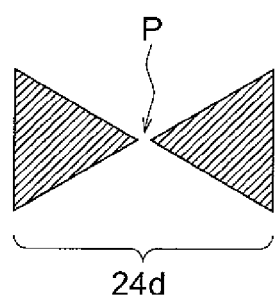
Figure 5C:
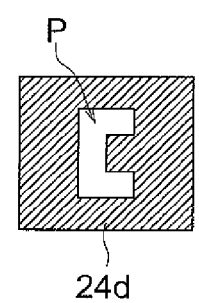

A plasmon probe 24d for generating the near field light is disposed at the focal point F of the core layer 21 or at a near point thereof FIGS. 5a through 5c show schematic diagrams indicating concrete examples of the shapes of the plasmon probe 24d.

Concretely speaking, FIG. 5a shows a schematic diagram indicating the plasmon probe 24d made of a triangular-shaped metallic thin film (example of material: such as an aluminum, a gold, a silver, etc.) and FIG. 5b shows a schematic diagram indicating the other plasmon probe 24d made of a bowtie-shaped metallic thin film (example of material: such as an aluminum, a gold, a silver, etc.), each of which is formed as an antenna having a vertex P whose radius of curvature is equal to or smaller than 20 nm. Further, FIG. 5c shows a schematic diagram indicating still the other plasmon probe 24d made of a plate-shaped metallic thin film (example of material: such as an aluminum, a gold, a silver, etc.), which has an aperture and is formed as an antenna having a vertex P whose radius of curvature is equal to or smaller than 20 nm. When the light acts onto any one of the plasmon probes 24d above-exemplified, a near field light is generated around a point near the vertex P of the plasmon probe 24d concerned, and makes it possible to perform an information recording or an information reproducing operation that employs a very small-sized light spot. In other words, if a localized plasmon is generated by disposing the plasmon probe 24d at the focal point F of the core layer 21 or a near point thereof, it becomes possible to make the size of the light spot, to be formed at the focal point, smaller than ever, resulting in the advantageous feature for the high density recording operation. In this connection, it is preferable that the vertex P of the plasmon probe 24d is positioned at the focal point F.

The diffraction grating 20a formed on the core layer 21 of the planar waveguide 20 is constituted by a plurality of grooves in parallel to the directrix of the parabola lines being the shapes of the side surfaces 26 and 27 formed on the core layer 21. The light 52 emitted from the light source 50 is deflected by the deflection optical element 51 and the deflected light enters into the diffraction grating 20a at a predetermined incident angle. It is possible to make the light, which has entered into the diffraction grating 20a at the predetermined incident angle, efficiently couple to the core layer 21.

In FIG. 3, the deflected light 52a that has deflected by the deflection optical element 51 and enters into the diffraction grating 20a is indicated by a light spot 55. The shape of the light spot 55 is an ellipse having a shot axis extending in a direction of an axis C. With respect to this ellipse shape of the light spot 55, detailed explanations will be provided later on.

The deflected light 52a, entering into the diffraction grating 20a at the predetermined incident angle, is coupled to the core layer 21, and propagates towards the direction being in parallel to the axis C of the parabola lines representing the shapes of the side surfaces 26 and 27, and is focused onto the focal point F, when viewing the deflected light 52a from the direction perpendicular to the surface of the drawing paper sheet of FIG. 3.

Figure 6:
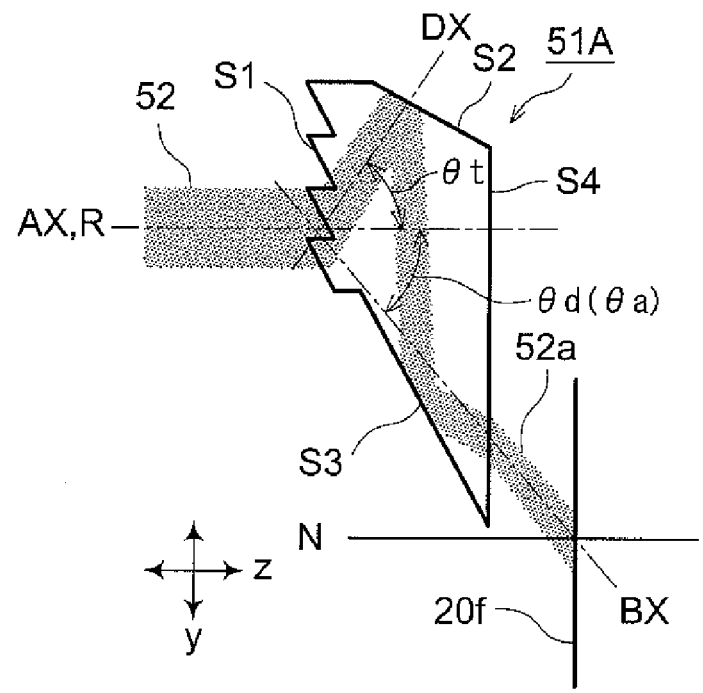
FIG. 6 shows a schematic diagram indicating a cross sectional view and an optical path of a deflection optical element embodied in the present invention as EMBODIMENT 1.

FIG. 6 shows a schematic diagram indicating an example of the deflection optical element 51 (deflection optical element 51A employed in the first embodiment detailed later). The deflection optical element 51A is provided with a diffraction surface formed on a first surface S1 onto which the light 52 enters, so that the incident light is deflected by the diffraction surface. Then, the deflected light 52a is further deflected twice by a second surface S2, formed as a reflection surface, and a third surface S3, also formed as a reflection surface, and finally, refracted and emitted by/from a fourth surface 84, serving as an emitting surface. Accordingly, an optical axis AX of the light 52, serving as the incident light, and an optical axis BX of the deflected light 52a, serving as the emitting light to be emitted from the fourth surface S4, are not in parallel to each other. The four deflecting actions abovementioned are achieved within a single deflection surface (surface coincide with that of the drawing paper sheet concerned). The light 52 that enters into the first surface S1 is such a parallel light whose cross section perpendicular to the optical axis AX is shaped in a circle.

The diffraction angle of the first surface S1 is set at 60°. Since no diffraction surface, other than that of the first surface S1, is provided in the deflection optical element 51A, a total sum of the diffraction angle (hereinafter, referred to as a total diffraction angle θt) of the deflection optical element 51A is also set at 60°. Hereinafter, the diffraction angle is defined as such an angle that is formed by a direction, in which the incident light to be enter into the incident surface (diffraction surface) having the diffraction grating formed thereon, propagates associated with a reflection, a refraction, etc., on the premise that no diffraction grating exists on the incident surface concerned (hereinafter in the following embodiments, referred to as an axis R), and another direction in which the diffraction light is actually deflected and actually propagates (hereinafter in the following embodiments, referred to as an axis DX). With respect to the deflection optical element 51A, when no diffraction grating exists, since the light 52 enters into the deflection optical element 51A along the direction orthogonal to the first surface S1, the light 52 straight-forwardly propagates on the optical axis AX as it is. However, in reality, since the diffraction grating exists, the light 52 is deflected so as to propagate in the direction of the axis DX. Therefore, the diffraction angle in the above case is set at the diffraction angle θt shown in FIG. 6.

Further, a deflection angle θd formed between the incident light (light 52) and the emission light (deflected light 52a) is set at 52.4°. Still further, when the deflection angle θd is smaller than 90°, an angle θa serving as an acute angle formed at the intersection of the optical axis AX of the incident light (light 52) and the optical axis BX of the emission light (deflected light 52a), can be found by the Equation of;

angle θa=deflection angle θd.

When the deflection angle θd exceeds 90°, the angle θa can be found by the Equation of angle θa=180°−deflection angle θd In this connection, the case that the deflection angle θd is equal to 90° is not included in the object of this embodiment.

Accordingly, the angle θa of the deflection optical element 51A is set at 52.4°, and the diffraction angle θt (=60°) is greater than the angle θa.

Still further, the normal line of an incident surface 20f of the diffraction grating 20a provided in the planar waveguide 20 is in parallel to the optical axis of the light 52. In other words, an acute angle θn to be formed at the intersection of the optical axis of the light 52 and the concerned normal line is set at 0°.

Accordingly, the diffraction angle θt, the angle θa and the acute angle θn, which are described in the foregoing, fulfill the following conditional relationship (1);

0≤θn<θa<θt    (1).

At first, the relationship that the angle θa is greater than the acute angle θn means that the deflection optical element 51 changes the angle of the light 52, and then, the light 52 enters into the diffraction grating 20a. Further, the relationship that the diffraction angle θt is greater than the angle θa means that the width of the cross sectional shape of the deflected light 52a is made to shrink in the deflecting direction (y-direction).

Accordingly, on the incident surface 20f on which the deflected light 52a emitted from the deflection optical element 51A enters into the diffraction grating 20a, the cross sectional shape of the deflected light 52a, which is perpendicular to the optical axis BX, can be made to be formed in an ellipse shape having a short axis extending in the deflection direction, by shortening its width in the deflecting direction (y-direction) without changing the its width in the direction perpendicular to the deflecting direction (x-direction).

According to this feature, since it is possible to preferably reduce the aberrations of the light entering into the diffraction grating 20a, it becomes possible to efficiently couple the concerned light to the core layer 21, so as to propagate within the core layer 21 and to form a sufficiently minimized light spot on the focal point F.

In this connection, although the light 52 entering into the first surface S1 is the parallel light, even if its cross sectional shape perpendicular to the optical axis is deformed from the circular shape to some extent, it is still possible to make the cross sectional shape of the deflected light 52a shrink in the deflecting direction (y-direction), and it is still possible to improve (reduce) the aberrations of the light entering into the diffraction grating 20a.

Although the deflection optical element 51A shown in FIG. 6 is provided with the single diffraction surface, it is also applicable that the deflection optical element 51A is provided with a plurality of diffraction surfaces. In this case, by making the total sum of the diffraction angles of the plurality of diffraction surfaces (total sum of the absolute value of the diffraction angles) larger than the angle θa serving as an acute angle formed at the intersection of the optical axis of the incident light (light 52) and the optical axis of the emission light (deflected light 52a), it is possible to make the cross sectional shape of the deflected light 52a shrink in the deflecting direction as well as the abovementioned (refer to the seventh embodiment detailed later).

It has been desired that the optical recording head 3 is such a small-sized device whose dimensional sizes are, for instance, 1 mm (length)×1 mm (width)×0.5 mm (height). For this reason, it is necessary to take the arrangements of the deflection optical element 51 and the planar waveguide 20, which are to be employed in the optical recording head 3, into account so as to achieve its minimization as smaller as possible.

It is preferable that the incident surface of the diffraction grating 20a is perpendicular to the optical axis of the light 52. This means that, when the light 52 emitted from the light source 50 enters into the diffraction grating 20a, the planar waveguide 20 is arranged at a position being perpendicular to the optical axis of the light 52, and accordingly, it becomes possible to form the shape of the slider 30, which is provided with the planar waveguide 20, as a simple rectangular shape. Further, it also becomes possible to arrange the light source 50, the deflection optical element 51 and the slider 30 onto the rear surface of the suspension 4 and/or the arm 5 in parallel, resulting in making the optical recording head 3 thinner than ever.

With respect to the relative arrangement of the deflection optical element 51 and the planar waveguide 20, it is preferable that the deflection angle is set at a vale around 60° in order to achieve the smallest volume. This is because, the deflection optical element 51 can be disposed at such a position that is equivalent to a vertex of an equilateral triangle, while the planar waveguide 20 can be disposed at such another position that is equivalent to a base line apex of the equilateral triangle, so as to balance the height and the length.

Further, in order to make the optical recording head 3 thinner in the height direction, it is preferable that the deflection angle is set at a vale around 30°. For instance, when the height of the planar waveguide 20 is set at around 0.2 mm, the diameter of the light bundle of the light 52 emitted from the light source 50 is set at around 0.05 mm, and the deflection optical element 51 is disposed by taking the incident angle of the light, entering into the planar waveguide 20, into account, it becomes possible to make the height of the optical recording head 3, constituted by the abovementioned, thinner to such an extent that the height is reduced to a value around 0.5 mm being approximately twice of the height of the planar waveguide 20.

Still further, from the condition for manufacturing the diffraction grating 20a provided in the planar waveguide 20, the desirable deflection angle is around 50°. With respect to the diffraction grating in which the incident angle and the deflection angle are set at 50° and 40°, respectively, since the period of diffraction grating can be set at a value around 0.1 µm (light source wavelength: around 780 nm), which is not too fine, it is easy to manufacture the diffraction grating concerned. In addition, it is also possible to sufficiently increase the number of gratings in respect to the diameter of the light bundle entering into the diffraction grating concerned, resulting in a good performance of the light coupling operation.

Figure 13:
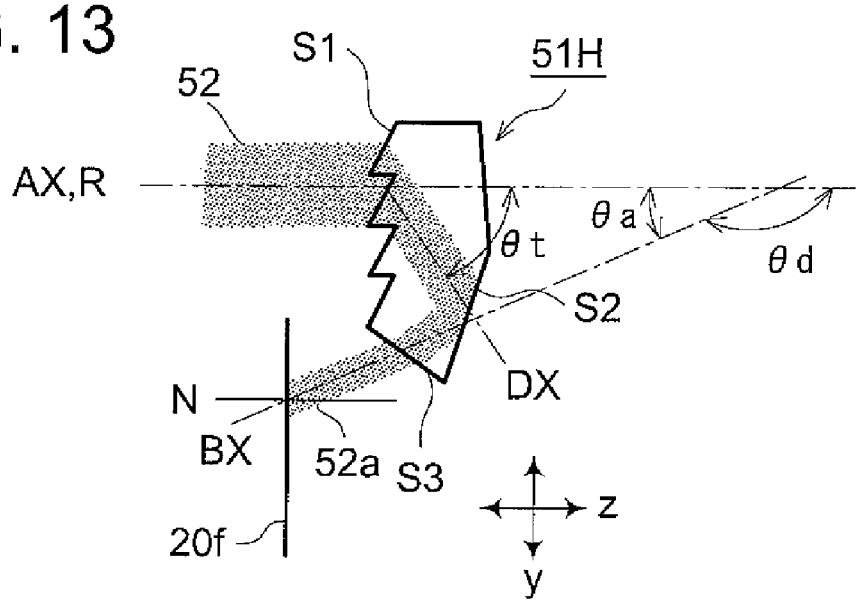
FIG. 13 shows a schematic diagram indicating a cross sectional view and an optical path of a deflection optical element embodied in the present invention as EMBODIMENT 8.

Further, depending on the relative arrangement of the light source 50 and the planar waveguide 20, it can be considered such a case that the deflection angle θd exceeds 90°, and the optical path is greatly folded back. For instance, in the configuration shown in FIG. 2, the arrangement order of the elements, fixed on the suspension 4 from the left side when facing the drawing paper sheet, is such the order of the light source 50, the deflection optical element 51 and the planar waveguide 20 of the optical recording head 3. The abovementioned case emerges when the arrangement order is changed to such another arrangement that the planar waveguide 20 is provided on the right side surface of the optical recording head 3, and the deflection optical element 51 is provided on the right edge portion of the suspension 4. FIG. 13 shows a schematic diagram indicating an example of the deflection optical element 51 in the abovementioned case (deflection optical element 51H of the eighth embodiment detailed later). The deflection angle θd of the deflection optical element 51H, shown in FIG. 13, exceeds 90°. Namely, the diffraction angle θt, representing the deflection angle of the first surface S1, is exceedingly larger than the angle θa (180−θd) serving as an acute angle formed at the intersection of the optical axis of the incident light (light 52) and the other optical axis of the emission light (deflected light 52a). Accordingly, even in this case, on the incident surface 20f on which the deflected light 52a emitted from the deflection optical element 51A enters into the diffraction grating 20a, the cross sectional shape of the deflected light 52a, which is perpendicular to the optical axis BX, can be made to be formed in an ellipse shape having a short axis extending in the deflection direction (y-direction) (refer to the eighth embodiment).

When the deflection angle θd is 120°, 150° or 130°, the optical recording head 3 can obtain the same effect when the abovementioned deflection angle θd is 60°, 30° or 50°, respectively.

Since the deflection angle θd can be freely set by combining the diffraction surface and the reflection surface with each other as needed, it becomes possible to easily cope with such operations for thinning the thickness of the optical recording head 3, achieving minimization of the optical recording head 3, etc.

Figure 19:
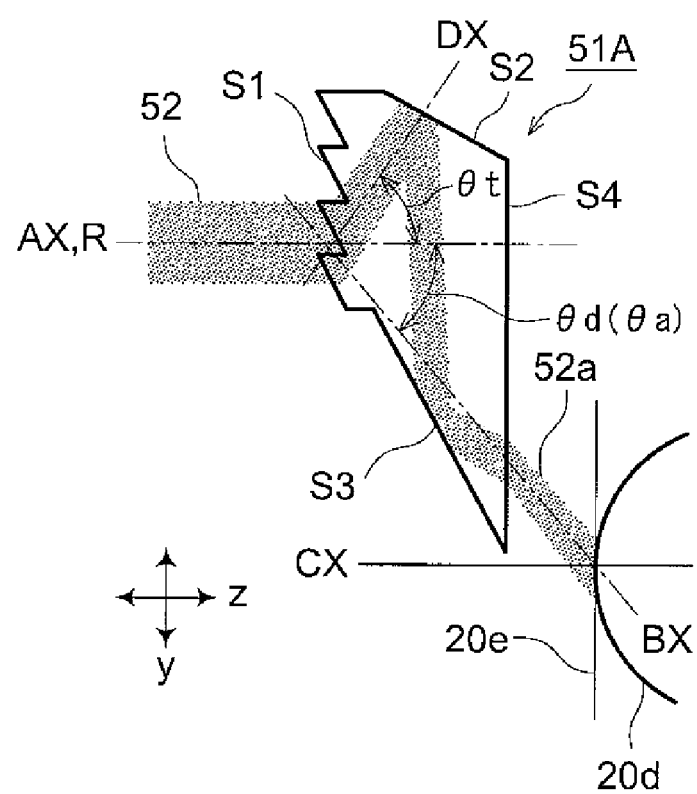
FIG. 19 shows a schematic diagram indicating an example in which an emission light emitted by a deflection optical element enters into a refracting optical system.

Although the embodiment has been described so far on the premise that the emission light (deflected light 52a) emitted from the deflection optical element 51 enters onto the diffraction grating 20a shaped in a plane surface, it is also possible to obtain the same effect as the abovementioned, even when the refraction optical system including a spherical lens, instead of the diffraction grating, is arranged therein. Concretely speaking, as shown in FIG. 19, by handling an optical axis CX in the same mariner as the normal line N of the incident surface of the diffraction grating aforementioned, at a surface 20e being perpendicular to the optical axis CX within an incident surface 20d located at a position being nearest to the deflection optical element 51, the cross sectional shape of the emission light (deflected light 52a), emitted from the deflection optical element 51 and being perpendicular to the optical axis BX, can be formed in an ellipse shape having a short axis extending in the deflection direction (y-direction). According to this feature, as well as the case of the diffraction grating, it becomes possible to preferably reduce the aberrations of the light entering into the refs action optical system.

The deflection optical element 51 can be made of, for instance, a thermoplastic resin material by employing the injection molding method or the press molding method. For instance, the ZEONEX (Registered Trade Mark) 480R (refraction index: 1.525, manufactured by Nippon Zeon Co. Ltd.), a PMMA (Polymethylmethacrylate, for instance, the SUMIPEX (Registered Trade Mark) MGSS, refraction index: 1.49, manufactured by Sumitomo Chemical Co. Ltd.), a PC (Polycarbonate, for instance, the Panlite (Registered Trade Mark) AD5503, refraction index: 1.585, manufactured by Teijin Chemical Co. Ltd.), etc., can be cited as the thermoplastic resin. Further, the deflection optical element 51 can be also made of a glass material. For instance, there has been such a method that the glass material is formed in a bar shape at first, and then, the bar-shaped glass material is further deformed in another shape having a desired cross sectional shape by employing the press molding method, and successively, a film-shaped diffraction grating, formed by employing the imprint molding method or made of a resin material, etc., is adhered onto the surface planed to be the diffraction grating, and then, an element having a predetermined length is cut out from the deformed-shaped glass bar, etc.

Although the embodiment described in the foregoing is in regard to the heat assistance magnetic recording head and the heat assistance magnetic recording apparatus provided with the same, it is also possible to utilize the above-described embodiment for the optical recording head and the optical recording apparatus that employs the optical recording disk as its recording medium. In that case, the magnetic recording section 40 and the magnetic reproducing section 41, both mounted on the slider 30, are not necessary.

EMBODIMENTS

Now, as the concrete examples of the deflection optical element 51 embodied in the present invention, EMBODIMENTS 1-12 will be detailed in the following. In the optical recording head 3 to be described in the following, it is assumed that each of the deflection optical elements, respectively indicated as the EMBODIMENTS 1-12, makes the parallel light (light 52), whose cross sectional shape perpendicular to the optical axis extended from the light source 50 is shaped in a circle, enter (couple) into the diffraction grating 20a provided in the planar waveguide 20. It is also assumed that each of the deflection optical elements is made of a resin material having a refraction index of 1.49.

FIGS. 6 through 17 show schematic diagrams indicating the cross sectional shapes of the deflection optical elements 51A through 51L corresponding to the EMBODIMENTS 1-12, respectively.

As shown in each of FIGS. 6 through 17, the optical axis of the light 52 entering into each of the deflection optical elements 51A through 51L is in parallel to the normal line N of the incident surface 20f (θn=0°).

Figure 18:
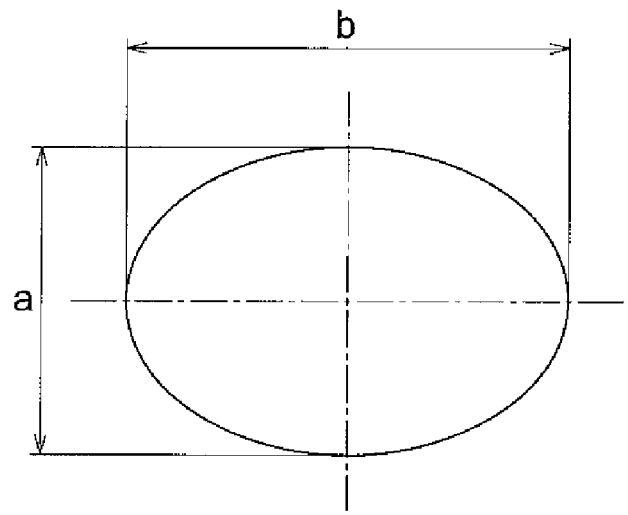
FIG. 18 shows an explanatory schematic diagram indicating a shape of an incident light entering into a diffraction grating, which is formed at an incident surface.

Further, the deflection surface of each of the deflection optical elements 51A through 51L (surface coinciding with that of the drawing paper sheet) is a single surface, and the optical axis AX of the incident light (light 52) is not in parallel to the optical axis BX of the emission light (deflected light 52a). As shown in FIG. 18, a diameter of an ellipse in the deflecting direction of each of the deflection optical elements 51A through 51L is defined as a first diameter "a", while another diameter of the ellipse in the direction perpendicular to the deflecting direction of each of the deflection optical elements 51A through 51L is defined as a second diameter "b", and the cross sectional shape of the incident light (light 52) at the incident surface 20f is represented by the first diameter "a": the second axis diameter "b", as an ellipse shape of a beam in the table.

In this connection, the ellipse shape of the beam in each of the EMBODIMENTS 1-12 indicates the shape of the spot at the incident surface 20f, instead of the cross sectional shape perpendicular to the optical axis BX. In other words, not only the cross sectional shape perpendicular to the optical axis BX of the emission light (deflected light 52a) is made to be an ellipse, but also the shape of spot at the incident surface 20f is made to be an ellipse, as a result of shrinking the width of the deflecting direction (y-direction).

In each of the schematic diagrams indicating the optical cross sectional surfaces of the deflection optical elements 51A through 51L, shown in FIGS. 6 through 17, the axis R represents the direction along which the light, entering into the diffraction grating, propagates according to the reflection, the refraction, etc., on the premise that the diffraction grating concerned does not exist Further, the axis DX represents the direction along which the light propagates while the light is actually deflected by the diffracting action, and the angle formed by the axis R and the axis DX is defined as a diffraction angle represented by the diffraction angle θt. In this connection, in the deflection optical element 51G, serving as EMBODIMENT 7, since the light is deflected twice at two points by the diffracting actions, the above-defined axes are represented by an axis R1, an axis R2, an axis DX1 and an axis DX2, respectively, and a diffraction angle formed by the axis R1 and the axis DX1 and another diffraction angle formed by the axis R2 and the axis DX2 are defined as a diffiaction angle θt1 and a (Inaction angle θt2, respectively.

Embodiment 1

FIG. 6 shows a schematic diagram indicating the shape of the deflection optical element 51A. The diffraction surface of the first surface S1 is schematically indicated in FIG. 6. The incident light 52 enters into the first surface S1 and is deflected in the direction of the axis DX by the diffracting action. When no diffraction surface is formed on the first surface S1, the light 52, entering into the first surface S1, propagates along the axis R being same as the optical axis AX of the light 52, as its optical axis. Accordingly, since no other diffraction surface exists, the total sum of the diffraction angles is only the diffraction angle θt formed by the axis R and the axis DX, which is equal to 60°. The angle θa (=deflection angle θd), serving as the acute angle formed at the intersection of the optical axis AX of the incident light (light 52) and the optical axis BX of the emission light (deflected light 52a), is equal to 52.4°, and the shape of the light at the incident surface 20f of the diffraction grating 20a is an ellipse in which the first diameter "a": the second axis diameter "b" is 0.770:1. From the manufacturing point of view, EMBODIMENT 1, in which only a single diffraction surface is provided, is advantageous, compared to such a configuration in which plural diffraction surface are provided.

In each of Tables 1-12 indicated in EMBODIMENTS 1-12 as follows, a change rate of the first diameter "a" before and after incident/emission at each of the surfaces is written for your reference. However, since the second axis diameter "b" does not change (all of them are equal to zero), these are not written in each of Tables 1-12.

TABLE 1

| Surface | Mode | Angle | Change rate of first diameter "a" |
|---|---|---|---|
| S1 | Refraction | 0° | 1 |
| S1 | Diffraction (θt) | 60° | cos60° |
| S2 | Reflection | — | 1 |
| S3 | Reflection | — | 1 |
| S4 | Refraction | 20° | cos20° |
| Deflection angle θd | | 52.4° | — |
| Angle θa | | 52.4° | 1/cos52.4° |
| Ellipse shape of beam | | | 0.77:1 |

Embodiment 2

Figure 7:
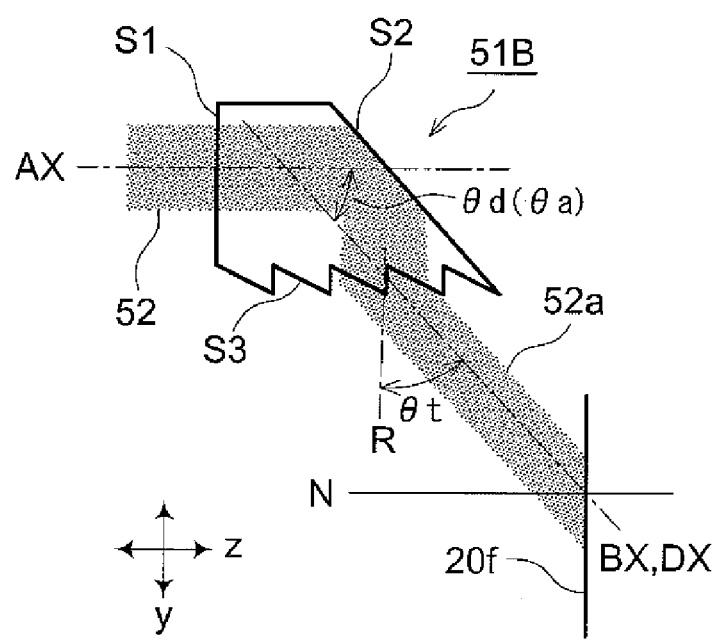
FIG. 7 shows a schematic diagram indicating a cross sectional view and an optical path of a deflection optical element embodied in the present invention as EMBODIMENT 2.

FIG. 7 shows a schematic diagram indicating the shape of the deflection optical element 51B. The diffraction surface of the third surface S3 is schematically indicated in FIG. 7. The axis DX represents the direction in which the light 52 is deflected by the diffracting action at the diffraction surface of the third surface S3. When no diffraction surface is formed on the first surface S3, the axis of the light emitted from the third surface S3 is indicated by the axis R. Accordingly, since no other diffraction surface exists, the total sum of the diffraction angles is only the diffraction angle θt formed by the axis R and the axis DX, which is equal to 50°. The angle θa (=deflection angle θd), serving as the acute angle formed at the intersection of the optical axis AX of the incident light (light 52) and the optical axis BX of the emission light (deflected light 52a), is equal to 48°, and the shape of the light at the incident surface 20f of the diffraction grating 20a is an ellipse in which the first diameter "a": the second axis diameter "b" is 0.946:1.

TABLE 2

| Surface | Mode | Angle | Change rate of first diameter "a" |
|---|---|---|---|
| S1 | Refraction | 0° | 1 |
| S2 | Reflection | — | 1 |
| S3 | Diffraction (θt) | 50° | cos50° |
| S3 | Refraction | 0.4° | cos0.4° |
| Deflection angle θd | | 48° | — |
| Angle θa | | 48° | 1/cos48° |
| Ellipse shape of beam | | | 0.946:1 |

Embodiment 3

Figure 8:
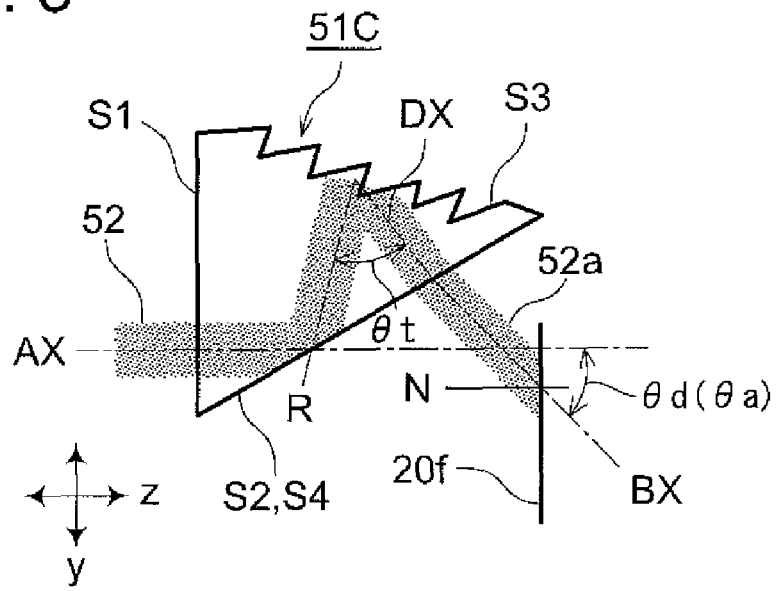
FIG. 8 shows a schematic diagram indicating a cross sectional view and an optical path of a deflection optical element embodied in the present invention as EMBODIMENT 3.

FIG. 8 shows a schematic diagram indicating the shape of the deflection optical element 51C. The diffraction surface of the third surface S3 is schematically indicated in FIG. 8. The axis DX represents the direction in which the light 52 is deflected by the diffracting action at the diffraction surface of the third surface S3. When no diffraction surface is formed on the third surface S3, the axis of the light reflected from the third surface S3 is indicated by the axis R. Accordingly, since no other diffraction surface exists, the total sum of the diffraction angles is only the diffraction angle θt formed by the axis R and the axis DX, which is equal to 53.5°. The angle θa (=deflection angle θd), serving as the acute angle formed at the intersection of the optical axis AX of the incident light (light 52) and the optical axis BX of the emission light (deflected light 52a), is equal to 52.4°, and the shape of the light at the incident surface 20f of the diffraction grating 20a is an ellipse in which the fast diameter "a": the second axis diameter "b" is 0.974:1.

TABLE 3

| Surface | Mode | Angle | Change rate of first diameter "a" |
|---|---|---|---|
| S1 | Refraction | 0° | 1 |
| S2 | Reflection | — | 1 |
| S3 | Diffraction (θt) | 53.5° | cos53.5° |
| S4(S2) | Refraction | 2.5° | cos2.5° |
| Deflection angle θd | | 52.4° | — |
| Angle θa | | 52.4° | 1/cos52.4° |
| Ellipse shape of beam | | | 0.974:1 |

Embodiment 4

Figure 9:
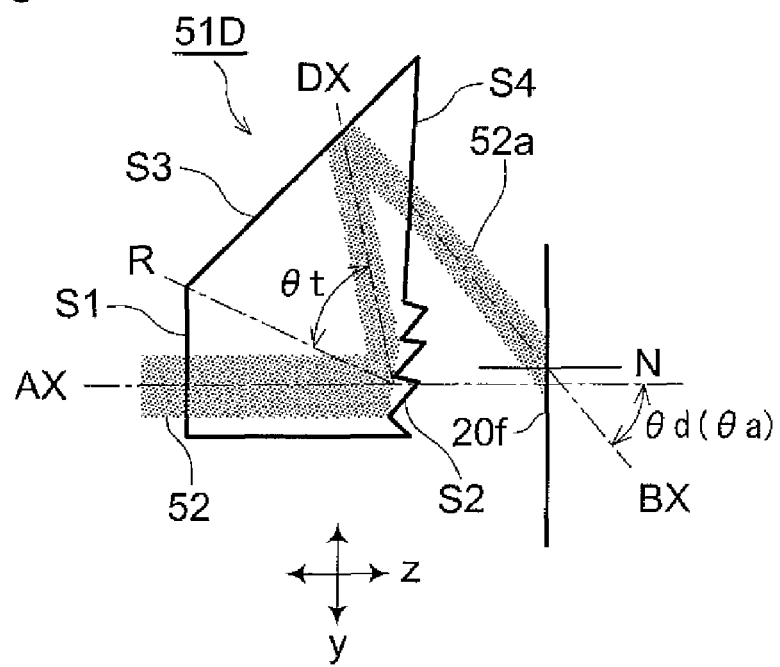
FIG. 9 shows a schematic diagram indicating a cross sectional view and an optical path of a deflection optical element embodied in the present invention as EMBODIMENT 4.

FIG. 9 shows a schematic diagram indicating the shape of the deflection optical element 51D. The diffraction surface of the second surface S2 is schematically indicated in FIG. 9. The axis DX represents the direction in which the light 52 is deflected by the diffracting action at the diffraction surface of the second surface S2. When no diffraction surface is formed on the second surface 82, the axis of the light reflected from the second surface S2 is indicated by the axis R. Accordingly, since no other diffraction surface exists, the total sum of the diffraction angles is only the diffraction angle θt formed by the axis R and the axis DX, which is equal to 53.5°. The angle θa (=deflection angle θd), serving as the acute angle formed at the intersection of the optical axis AX of the incident light (light 52) and the optical axis BX of the emission light (deflected light 52a), is equal to 52.4°, and the shape of the light at the incident surface 20f of the diffraction grating 20a is an ellipse in which the first diameter "a": the second axis diameter "b" is 0.968:1.

TABLE 4

| Surface | Mode | Angle | Change rate of first diameter "a" |
|---|---|---|---|
| S1 | Refraction | 0° | 1 |
| S2 | Diffraction (θt) | 53.5° | cos53.5° |
| S3 | Reflection | — | 1 |
| S4 | Refraction | 7° | cos7 |
| Deflection angle θd | | 52.4° | — |
| Angle θa | | 52.4° | 1/cos52.4° |
| Ellipse shape of beam | | | 0.968:1 |

Embodiment 5

Figure 10:
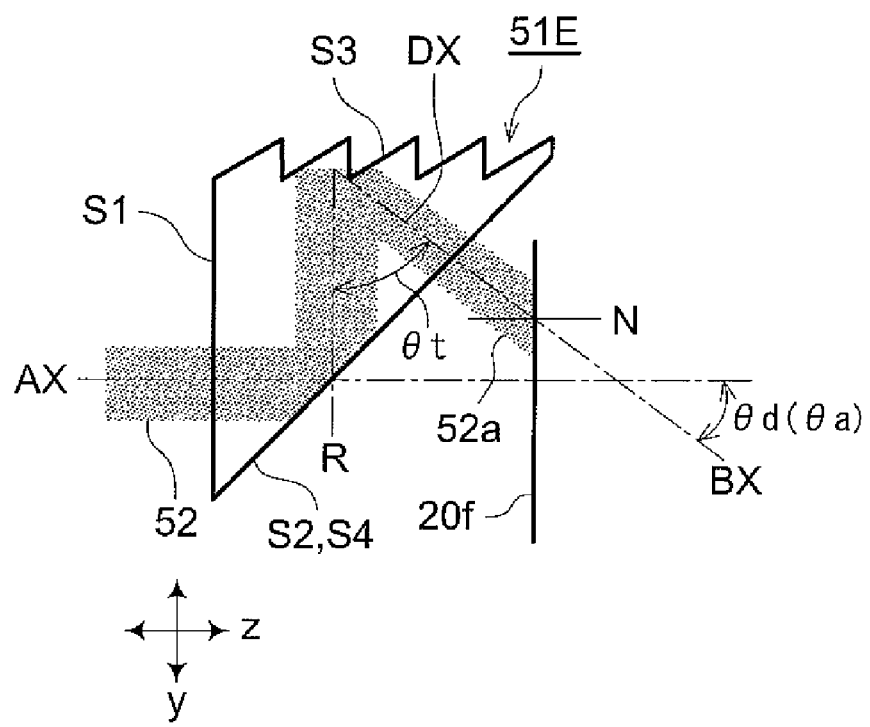
FIG. 10 shows a schematic diagram indicating a cross sectional view and an optical path of a deflection optical element embodied in the present invention as EMBODIMENT 5.

FIG. 10 shows a schematic diagram indicating the shape of the deflection optical element 51E. The diffraction surface of the third surface S3 is schematically indicated in FIG. 10. The axis DX represents the direction in which the light 52 is deflected by the diffracting action at the diffraction surface of the third surface S3. When no diffraction surface is formed on the third surface S3, the axis of the light reflected from third surface S3 is indicated by the axis R. Accordingly, since no other diffraction surface exists, the total sum of the diffraction angles is only the diffraction angle θt formed by the axis R and the axis DX, which is equal to 53.5°. The angle θa (=deflection angle θd), serving as the acute angle formed at the intersection of the optical axis AX of the incident light (light 52) and the optical axis BX of the emission light (deflected light 52a), is equal to 52.4°, and the shape of the light at the incident surface 20f of the diffraction grating 20a is an ellipse in which the first diameter "a": the second axis diameter "b" is 0.975:1.

TABLE 5

| Surface | Mode | Angle | Change rate of first diameter "a" |
|---|---|---|---|
| S1 | Refraction | 0° | 1 |
| S2 | Reflection | — | 1 |
| S3 | Diffraction (θt) | 53.5° | cos53.5° |
| S4(S2) | Refraction | 1° | cos1° |
| Deflection angle θd | | 52.4° | — |
| Angle θa | | 52.4° | 1/cos52.4° |
| Ellipse shape of beam | | | 0.975:1 |

Embodiment 6

Figure 11:
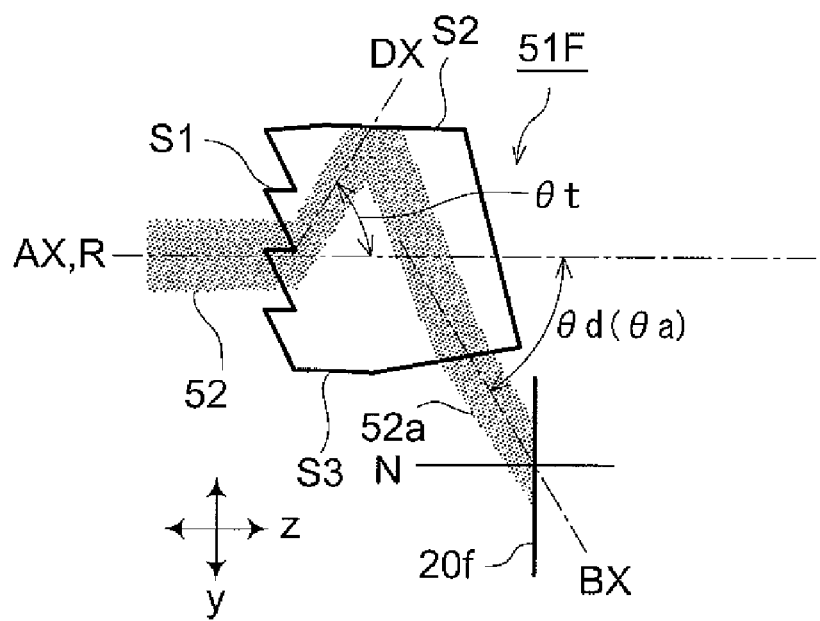
FIG. 11 shows a schematic diagram indicating a cross sectional view and an optical path of a deflection optical element embodied in the present invention as EMBODIMENT 6.

FIG. 11 shows a schematic diagram indicating the shape of the deflection optical element 51F. The diffraction surface of the first surface S1 is schematically indicated in FIG. 11. The incident light 52 enters into the first surface S1 and is deflected in the direction of the axis DX by the diffracting action. When no diffraction surface is formed on the first surface S1, the light 52, entering into the first surface S1, propagates along the axis R being same as the optical axis AX of the light 52, as its optical axis. Accordingly, since no other diffraction surface exists, the total sum of the diffraction angles is only the diffraction angle θt formed by the axis R and the axis DX, which is equal to 62°. The angle θa (=deflection angle θd), serving as the acute angle formed at the intersection of the optical axis AX of the incident light (light 52) and the optical axis BX of the emission light (deflected light 52a), is equal to 60°, and the shape of the light at the incident surface 20f of the diffraction grating 20a is an ellipse in which the first diameter "a": the second axis diameter "b" is 0.935:1.

TABLE 6

| Surface | Mode | Angle | Change rate of first diameter "a" |
|---|---|---|---|
| S1 | Refraction | 0° | 1 |
| S1 | Diffraction (θt) | 62° | cos62° |
| S2 | Reflection | — | 1 |
| S3 | Refraction | 5° | cos5° |
| Deflection angle θd | | 60° | — |
| Angle θa | | 60° | 1/cos60° |
| Ellipse shape of beam | | | 0.935:1 |

Embodiment 7

Figure 12:
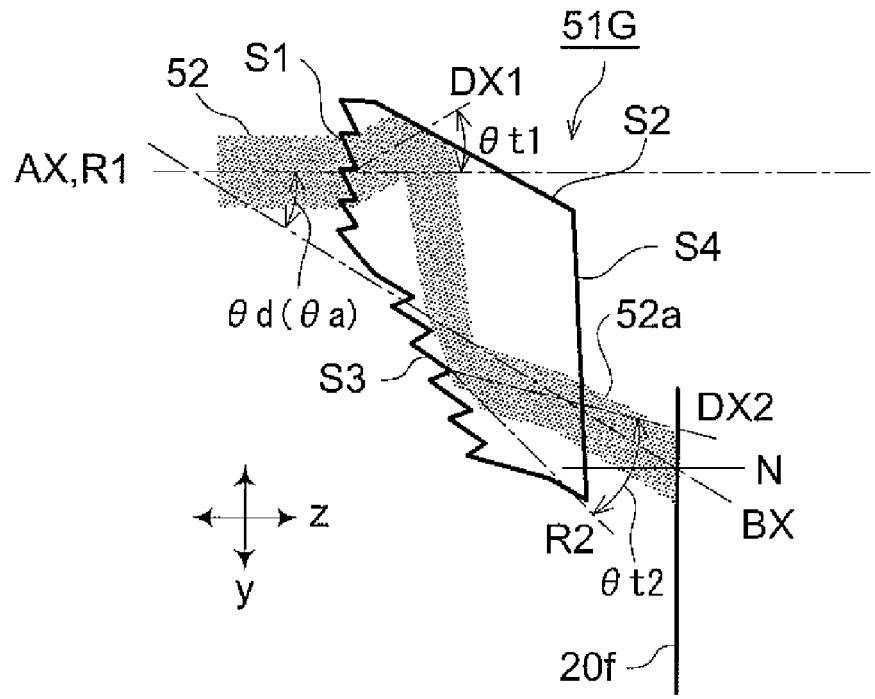
FIG. 12 shows a schematic diagram indicating a cross sectional view and an optical path of a deflection optical element embodied in the present invention as EMBODIMENT 7.

FIG. 12 shows a schematic diagram indicating the shape of the deflection optical element 51O. The diffraction surfaces of the first surface S1 and the third surface S3 are schematically indicated in FIG. 12.

The incident light 52 perpendicularly enters into the first surface S1 and is deflected in the direction of the axis DX by the diffracting action. When no diffraction surface is formed on the first surface S1, the light 52, entering into the first surface S1, propagates along the axis R1 being same as the optical axis AX of the light 52, as its optical axis. Accordingly, the diffraction angle at the first surface S1 is an angle θt1 formed by the axis R1 and the axis DX. Further, the axis DX2 represents the direction in which the light 52 is deflected by the diffraction surface of the third surface S3, and the axis R2 represents the other direction in which the light 52 is reflected from the third surface S3 when no diffraction surface is formed on the third surface S3. Accordingly, the diffraction angle at the third surface S3 is an angle θt2 formed by the axis R2 and the axis DX2. Therefore, the total sum of the diffraction angles θt is equal to 60° (=θt1 (30°)+θt2(30°)). The angle θa deflection angle θd), serving as the acute angle formed at the intersection of the optical axis AX of the incident light (light 52) and the optical axis BX of the emission light (deflected light 52a), is equal to 30°, and the shape of the light at the incident surface 20f of the diffraction grating 20a is an ellipse in which the first diameter "a": the second axis diameter "b" is 0.865:1.

TABLE 7

| Surface | Mode | Angle | Change rate of first diameter "a" |
|---|---|---|---|
| S1 | Refraction | 0° | 1 |
| S1 | Diffraction (θt1) | 30° | cos30° |
| S2 | Reflection | — | 1 |
| S3 | Diffraction (θt2) | 30° | cos30° |
| S4 | Refraction | 2° | cos2° |
| Deflection angle θd | | 30° | — |
| Angle θa | | 30° | 1/cos30° |
| Ellipse shape of beam | | | 0.865:1 |

Embodiment 8

FIG. 13 shows a schematic diagram indicating the shape of the deflection optical element 51H. The diffraction surface of the first surface S1 is schematically indicated in FIG. 13. The incident light 52 perpendicularly enters into the first surface S1 and is deflected in the direction of the axis DX by the diffracting action. When no diffraction surface is formed on the first surface S1, the light 52, entering into the first surface S1, propagates along the axis R being same as the optical axis AX of the light 52, as its optical axis. Accordingly, since no other diffraction surface exists, the total sum of the diffraction angles is only the diffraction angle θt formed by the axis R and the axis DX, which is equal to 60°. The angle θa (=deflection angle θd), serving as the acute angle formed at the intersection of the optical axis AX of the incident light (light 52) and the optical axis BX of the emission light (deflected light 52a), is equal to 30°, and the shape of the light at the incident surface 20f of the diffraction grating 20a is an ellipse in which the first diameter "a": the second axis diameter "b" is 0.575:1.

TABLE 8

| Surface | Mode | Angle | Change rate of first diameter "a" |
|---|---|---|---|
| S1 | Refraction | 0° | 1 |
| S1 | Diffraction (θt) | 60° | cos60° |
| S2 | Reflection | — | 1 |
| S3 | Refraction | 5° | cos5° |
| Deflection angle θd | | 150° | — |
| Angle θa | | 30° | 1/cos30° |
| Ellipse shape of beam | | | 0.575:1 |

Embodiment 9

Figure 14:
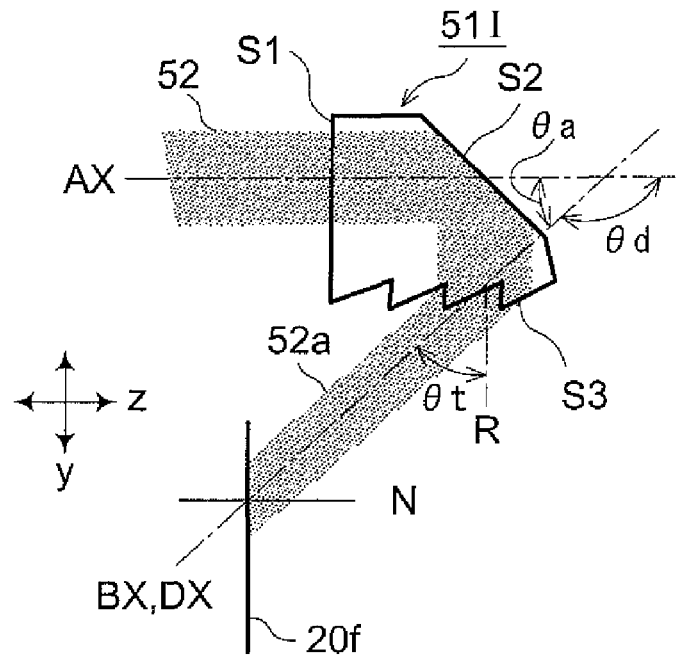
FIG. 14 shows a schematic diagram indicating a cross sectional view and an optical path of a deflection optical element embodied in the present invention as EMBODIMENT 9.

FIG. 14 shows a schematic diagram indicating the shape of the deflection optical element 51I. The diffraction surface of the third surface S3 is schematically indicated in FIG. 14. The axis DX represents the direction in which the light 52 is deflected by the diffraction surface of the third surface S3, and the axis R represents the other direction in which the light 52 is emitted from the third surface S3 when no diffraction surface is formed on the third surface S3. Accordingly, since no other diffraction surface exists, the total sum of the diffraction angles is only the diffraction angle θt formed by the axis R and the axis DX, which is equal to 50°. The angle θa, serving as the acute angle formed at the intersection of the optical axis AX of the incident light (light 52) and the optical axis BX of the emission light (deflected light 52a), is equal to 48° (while deflection angle θd is equal to 132°), and the shape of the light at the incident surface 20f of the diffraction grating 20a is an ellipse in which the first diameter "a": the second axis diameter "b" is 0.961:1.

TABLE 9

| Surface | Mode | Angle | Change rate of first diameter "a" |
|---|---|---|---|
| S1 | Refraction | 0° | 1 |
| S2 | Reflection | — | 1 |
| S3 | Diffraction (θt) | 50° | cos50° |
| S3 | Refraction | 0° | 1 |
| Deflection angle θd | | 132° | — |
| Angle θa | | 48° | 1/cos48° |
| Ellipse shape of beam | | | 0.961:1 |

Embodiment 10

Figure 15:
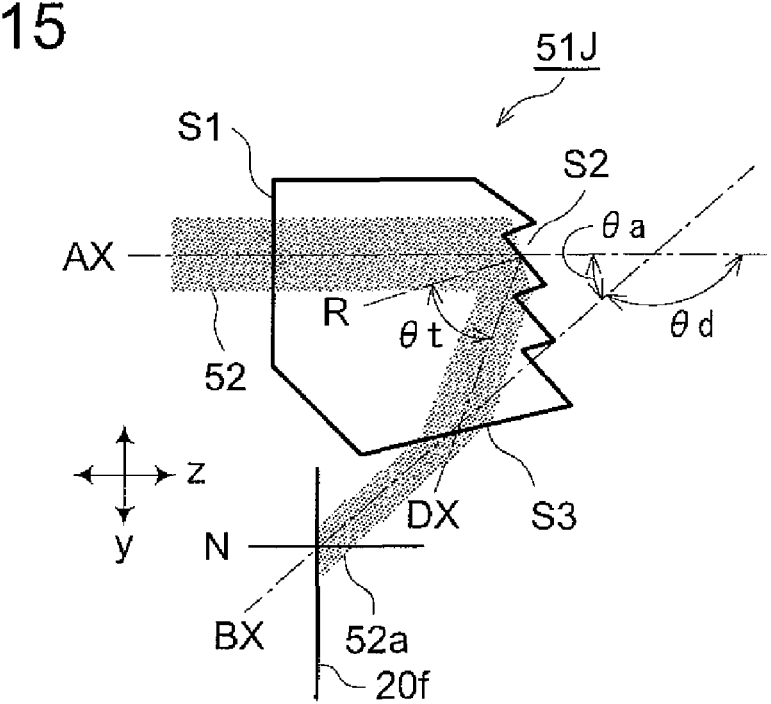
FIG. 15 shows a schematic diagram indicating a cross sectional view and an optical path of a deflection optical element embodied in the present invention as EMBODIMENT 10.

FIG. 15 shows a schematic diagram indicating the shape of the deflection optical element 51J. The diffraction surface of the second surface S2 is schematically indicated in FIG. 15. The axis DX represents the direction in which the light 52 is deflected by the diffraction surface of the second surface S2, and the axis R represents the other direction in which the light 52 is emitted from the second surface S2 when no diffraction surface is formed on the second surface S2. Accordingly, since no other diffraction surface exists, the total sum of the diffraction angles is only the diffraction angle θt formed by the axis R and the axis DX, which is equal to 53.5°. The angle θa, serving as the acute angle formed at the intersection of the optical axis AX of the incident light (light 52) and the optical axis BX of the emission light (deflected light 52a), is equal to 52.4° (while deflection angle θd is equal to 127.6°, and the shape of the light at the incident surface 20f of the diffraction grating 20a is an ellipse in which the first diameter "a": the second axis diameter "b" is 0.916:1.

TABLE 10

| Surface | Mode | Angle | Change rate of first diameter "a" |
|---|---|---|---|
| S1 | Refraction | 0° | 1 |
| S2 | Diffraction (θt) | 53.5° | cos53.5° |
| S3 | Refraction | 20.1° | Cos20.1° |
| Deflection angle θd | | 127.6° | — |
| Angle θa | | 52.4° | 1/cos52.4° |
| Ellipse shape of beam | | | 0.916:1 |

Embodiment 11

Figure 16:
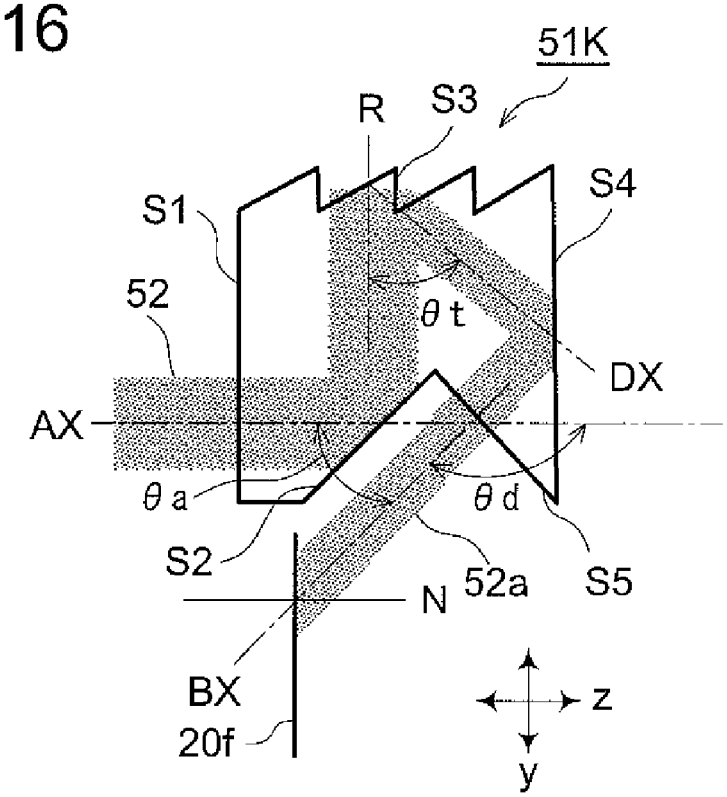
FIG. 16 shows a schematic diagram indicating a cross sectional view and an optical path of a deflection optical element embodied in the present invention as EMBODIMENT 11.

FIG. 16 shows a schematic diagram indicating the shape of the deflection optical element 51K. The diffraction surface of the second surface S2 is schematically indicated in FIG. 16. The axis DX represents the direction in which the light 52 is deflected by the diffraction surface of the third surface S3, and the axis R represents the other direction in which the light 52 is reflected from the third surface S3 when no diffraction surface is formed on the third surface S3. Accordingly, since no other diffraction surface exists, the total sum of the diffraction angles is only the diffraction angle θt formed by the axis R and the axis DX, which is equal to 53.5°. The angle θa, serving as the acute angle formed at the intersection of the optical axis AX of the incident light (light 52) and the optical axis BX of the emission light (deflected light 52a), is equal to 52.4° (while deflection angle θd is equal to 127.6°), and the shape of the light at the incident surface 20f of the diffraction grating a 20a is an ellipse in which the first diameter "a": the second axis diameter "b" is 0.975:1.

TABLE 11

| Surface | Mode | Angle | Change rate of first diameter "a" |
|---|---|---|---|
| S1 | Refraction | 0° | 1 |
| S2 | Reflection | — | 1 |
| S3 | Diffraction (θt) | 53.5° | cos53.5° |
| S4 | Reflection | — | 1 |
| S5 | Refraction | 0° | 1 |
| Deflection angle θd | | 127.6° | — |
| Angle θa | | 52.4° | 1/cos52.4° |
| Ellipse shape of beam | | | 0.975:1 |

Embodiment 12

Figure 17:
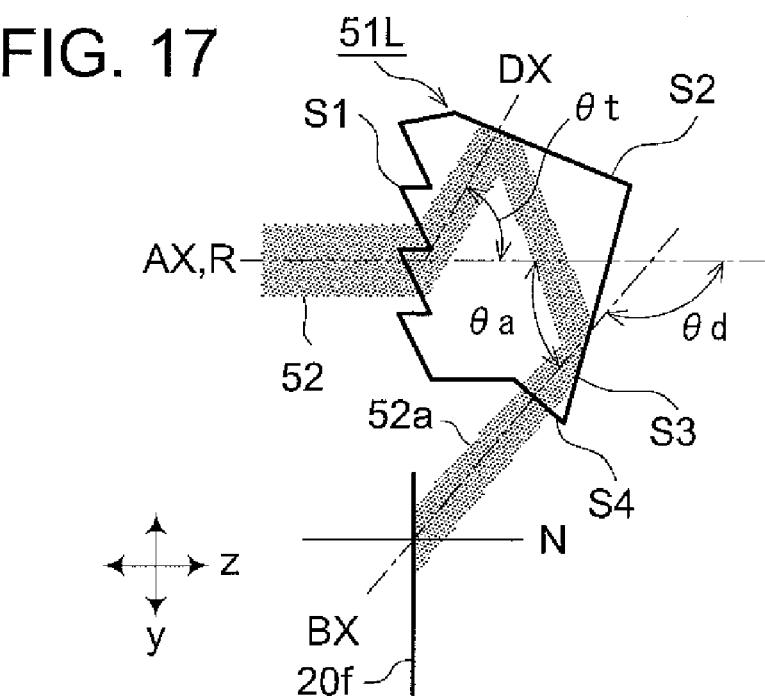
FIG. 17 shows a schematic diagram indicating a cross sectional view and an optical path of a deflection optical element embodied in the present invention as EMBODIMENT 12.

FIG. 17 shows a schematic diagram indicating the shape of the deflection optical element 51L. The diffraction surface of the first surface S1 is schematically indicated in FIG. 13. The incident light 52 perpendicularly enters into the first surface S1 and is deflected in the direction of the axis DX by the diffracting action. When no diffraction surface is formed on the first surface S1, the light 52, entering into the first surface S1, propagates along the axis R being same as the optical axis AX of the light 52, as its optical axis. Accordingly, since no other diffraction surface exists, the total sum of the diffraction angles is only the diffraction angle θt formed by the axis R and the axis DX, which is equal to 62°. The angle θa, serving as the acute angle formed at the intersection of the optical axis AX of the incident light (light 52) and the optical axis BX of the emission light (deflected light 52a), is equal to 60° (while deflection angle θd is equal to 120°), and the shape of the light at the incident surface 20f of the diffraction grating 20a is an ellipse in which the first diameter "a": the second axis diameter "b" is 0.939:1.

TABLE 12

| Surface | Mode | Angle | Change rate of first diameter "a" |
|---|---|---|---|
| S1 | Refraction | 0° | 1 |
| S1 | Diffraction (θt) | 62° | cos62° |
| S2 | Reflection | — | 1 |
| S3 | Reflection | — | 1 |
| S4 | Refraction | 0° | 1 |
| Deflection angle θd | | 120° | — |
| Angle θa | | 60° | 1/cos60° |
| Ellipse shape of beam | | | 0.939:1 |

According to any one of EMBODIMENTS 1 through 12 abovementioned, since it is possible to make the first diameter "a" shorter than the second axis diameter "b" without changing the second axis diameter "b", which is perpendicular to the deflecting direction of the deflected light 52a emitted from the corresponding one of the deflection optical elements 51A through 51L and entering into the incident surface 20f of the diffraction grating 20a, it becomes possible to preferably suppress the aberrations of the light entering into the diffraction grating 20a, and to make the concerned light efficiently couple to the core layer 21, so as to propagate in the core layer 21 to form a light spot, the diameter of which is smaller than ever, onto the focal point F.

Further, the angle θa of the every one of the deflection optical elements 51A through 51L, respectively corresponding to EMBODIMENTS 1 through 12 abovementioned, is set at a value in a range of 30°-60°. Accordingly, it becomes possible to make the optical recording head 3 comply with the minimization and thinning conditions of its size. Further, the light coupling property of the diffraction grating 20a, onto which the light emitted from any one of the deflection optical elements 51A through 51L enters, is good, and it becomes possible to easily manufacture the diffraction grating 20a.

According to the present invention, the following effects can be attained.

It becomes possible to deflect the incident light so as to couple the incident light to an optical element disposed in the later stage without deteriorating the optical efficiency. Further, when the present invention is applied to an optical recording head, it also becomes possible to thin and minimize the size of the optical recording head.

The invention claimed is:

1. A deflection optical element that deflects an incident light coming along a first optical axis at a deflection surface and emits an emission light propagating along a second optical axis, so as to couple the emission light to either a diffraction grating or a refracting optical system, wherein the first optical axis and the second optical axis are in unparallel with each other, and either a normal line of the diffraction grating or a third optical axis of the refracting optical system intersects the first optical axis at an angle θn, serving as an acute angle formed at a first intersection thereof, the deflection optical element comprising:
   at least one diffracting surface; and
   at least one reflecting surface;
   wherein the angle θn, an angle θt derived as a total diffraction angle caused by the at least one diffracting surface, and an angle θa, which is formed at a second intersection of the first optical axis and the second optical axis, fulfill a conditional relationship of:

$0 \leq \theta n \leq \theta a < \theta t$.

2. The deflection optical element of claim 1,
   wherein the at least one diffracting surface is a single diffracting surface.

3. The deflection optical element of claim 1,
   wherein the angle θa is set at a value in a range of 30°-60°.

4. An optical recording head, comprising:
   a deflection optical element that deflects an incident light coming along a first optical axis at a deflection surface and emits an emission light propagating along a second optical axis, so as to couple the emission light to either a diffraction grating or a refracting optical system, wherein the first optical axis and the second optical axis are in unparallel with each other, and either a normal line of the diffraction grating or a third optical axis of the refracting optical system intersects the first optical axis at an angle θn, serving as an acute angle formed at a first intersection thereof; and
   a slider that is provided with a diffraction grating into which the emission light emitted by the deflection optical element enters, and an optical element through which the emission light, entering from the diffraction grating, propagates so as to irradiate the emission light onto a recording medium;
   wherein the deflection optical element includes:
      at least one diffracting surface; and
      at least one reflecting surface;
   wherein the angle θn, an angle θt derived as a total diffraction angle caused by the at least one diffracting surface, and an angle θa, which is formed at a second intersection of the first optical axis and the second optical axis, fulfill a conditional relationship of:

$0 \leq \theta n < \theta a < \theta t$.

5. The optical recording head of claim 4,
wherein the at least one diffracting surface is a single diffracting surface.

6. The optical recording head of claim 4,
wherein the angle θa is set at a value in a range of 30°-60°.

7. The optical recording head of claim 4,
wherein an incident surface of the diffraction grating, which receives the emission light emitted by the deflection optical element, is perpendicular to the first optical axis along which the incident light enters into the deflection optical element.

8. An optical recording apparatus, comprising:
a light source;
an optical recording head into which an incident light emitted by the light source enters; and
a recording medium into which the optical recording head records information;
wherein the optical recording head, comprises:
    a deflection optical element that deflects the incident light coming along a first optical axis at a deflection surface and emits an emission light propagating along a second optical axis, so as to couple the emission light to either a diffraction grating or a refracting optical system, wherein the first optical axis and the second optical axis are in unparallel with each other, and either a normal line of the diffraction grating or an third optical axis of the refracting optical system intersects the first optical axis at an angle θn, serving as an acute angle formed at a first intersection thereof; and
    a slider that is provided with a diffraction grating into which the emission light emitted by the deflection optical element enters, and an optical element through which the emission light, entering from the diffraction grating, propagates so as to irradiate the emission light onto the recording medium;
wherein the deflection optical element includes:
    at least one diffracting surface; and
    at least one reflecting surface;
wherein the angle θn, an angle θt derived as a total diffraction angle caused by the at least one diffracting surface, and an angle θa, which is formed at a second intersection of the first optical axis and the second optical axis, fulfill a conditional relationship of:

$$0 \leq \theta n < \theta a < \theta t.$$

9. The optical recording apparatus of claim 8,
wherein the at least one diffracting surface is a single diffracting surface.

10. The optical recording apparatus of claim 8,
wherein the angle θa is set at a value in a range of 30°-60°.

11. The optical recording apparatus of claim 8,
wherein a light-bundle cross sectional shape of the incident light in a direction perpendicular to the first optical axis, along which the incident light emitted by the light source enters into the optical recording head, is a circle.

* * * * *